April 6, 1965   J. W. WALSH   3,176,684
PELVIC TRACTION BELT
Filed Nov. 15, 1962   2 Sheets-Sheet 1
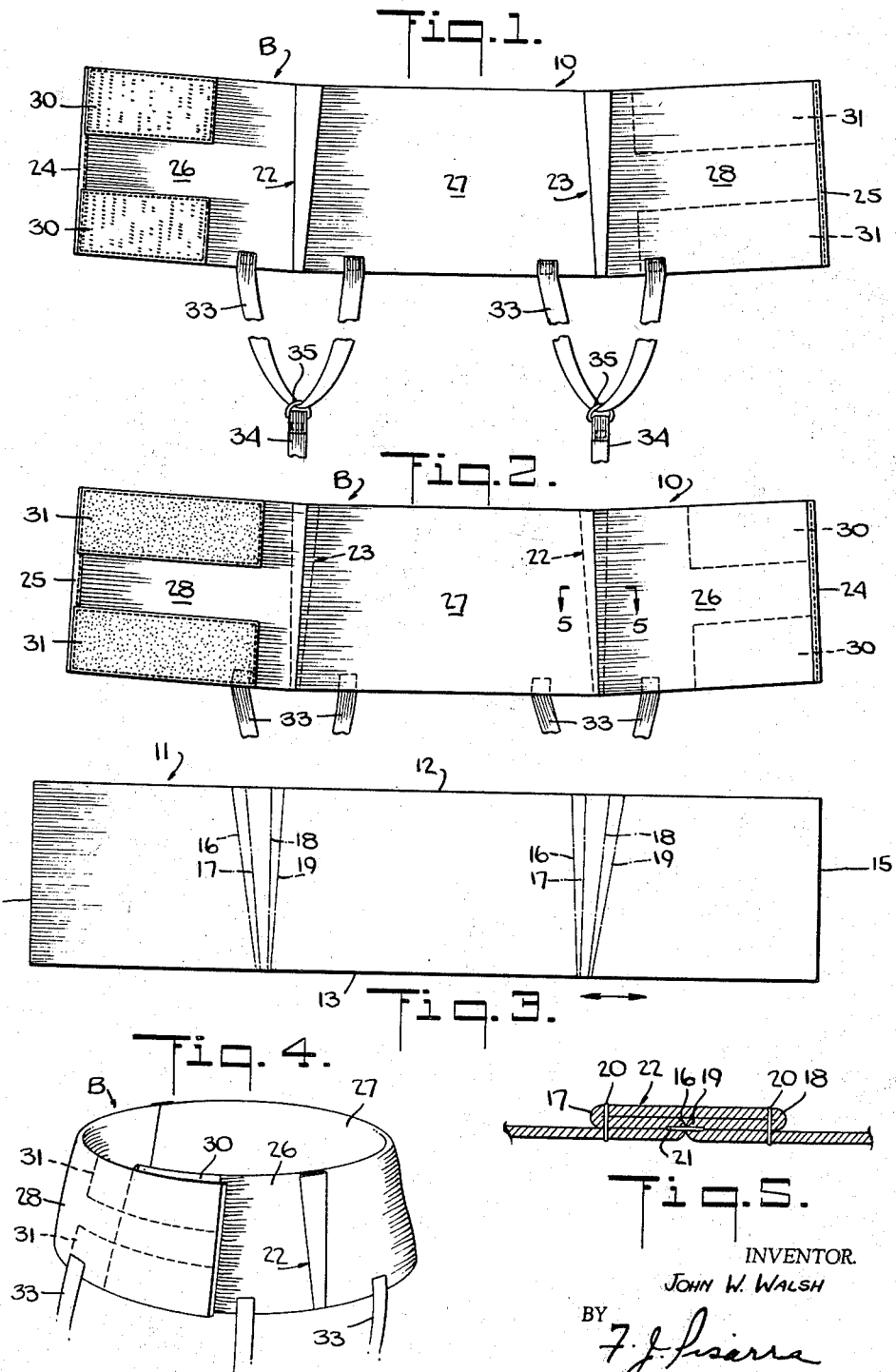
INVENTOR.
JOHN W. WALSH
BY
F. J. Pisarra
ATTORNEY April 6, 1965  J. W. WALSH  3,176,684
PELVIC TRACTION BELT
Filed Nov. 15, 1962  2 Sheets-Sheet 2
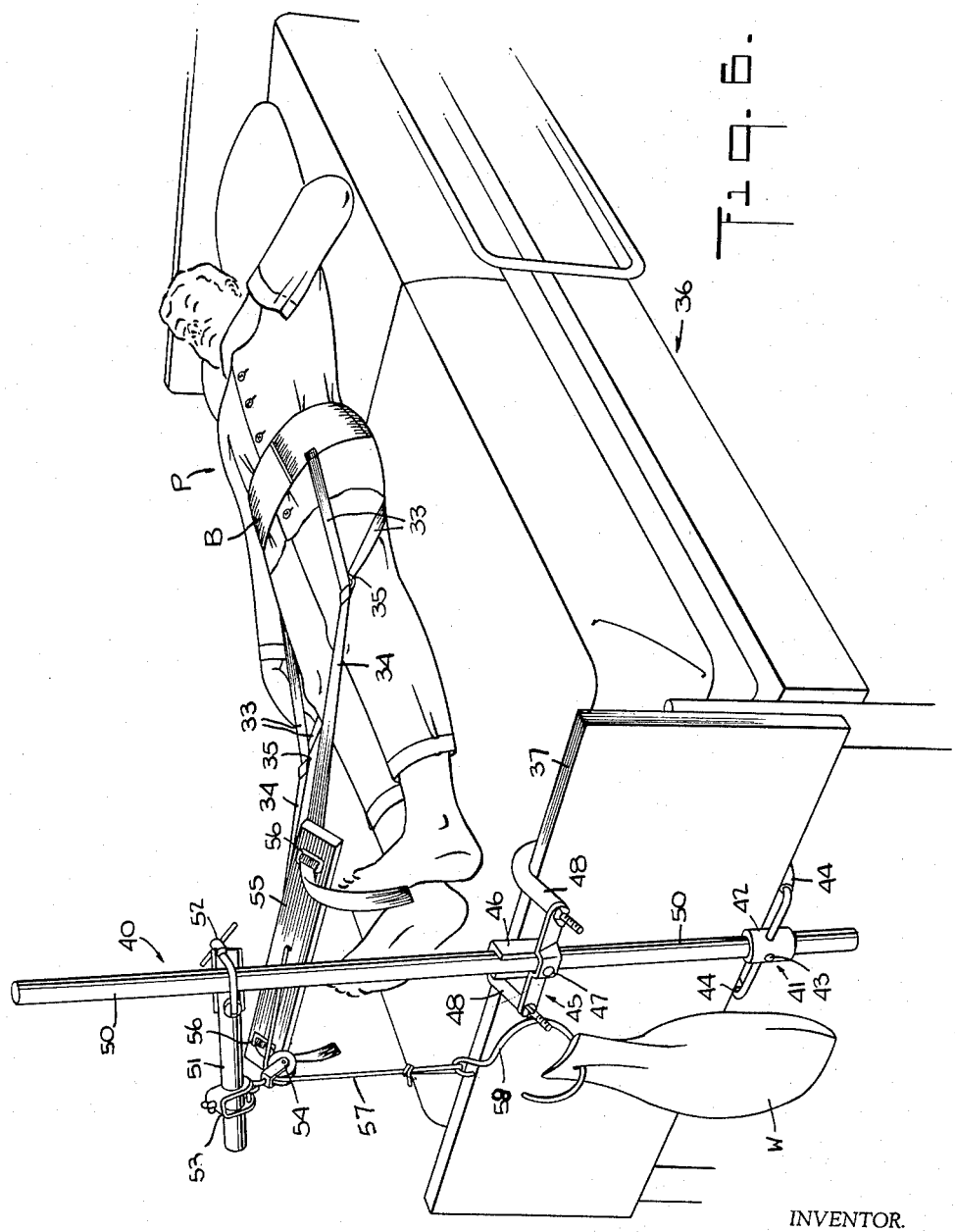
INVENTOR.
JOHN W. WALSH
BY
F. J. Pizarra
ATTORNEY

United States Patent Office 3,176,684
Patented Apr. 6, 1965

3,176,684
PELVIC TRACTION BELT
John W. Walsh, Memphis, Tenn., assignor to Lee's Orthopedic Appliances, Inc., Memphis, Tenn., a corporation of Tennessee
Filed Nov. 15, 1962, Ser. No. 237,935
4 Claims. (Cl. 128—75)

This invention relates to the art of surgical appliances and, more particularly, to an improved pelvic traction belt for treating various syndromes and ailments occurring in low back regions of individual patients.

Present day pelvic traction belts are essentially non-yielding for the reason that the portions thereof which encircle a patient's waist are substantially non-resilient. As a result, such belts are equipped with metallic fastening devices, including buckles, clasps and fasteners, for joining the ends of the belt and maintaining the belt under requisite tension in use. The usual procedure in applying, fastening and adjusting conventional pelvic traction belts is time-consuming and is frequently painful and disturbing to the patient. Even when the belt is in place, its metallic fastening devices often cause discomfort to the patient.

The pelvic traction belt of this invention eliminates the difficulties experienced with and objections to known similar belts and affords a number of worthwhile advantages thereover. Such advantages include the following:

(1) The belt of this invention is wholly elastic as compared to the essentially non-resilient cloth constructions of conventional belts, and, as a consequence, conforms more completely to the contours of a patient's waist and upper hip region in use;

(2) The portions of the belt of this invention which are wrapped around a patient's waist are devoid of metallic fasteners, thereby minimizing possible discomfort and annoyance to the patient in use; and (3) The parts of the present traction belt are so constructed and arranged as to permit the same to be easily and quickly applied to and subsequently removed from a patient.

The primary object of this invention is to provide a pelvic traction belt having improved and simplified features of design and construction.

Another object of this invention is to provide a pelvic traction belt which conforms properly to the portions of a patients' body to which it is adapted to be applied.

The invention has for a further object the provision of a novel and improved pelvic traction belt which is essentially elastic, which is devoid of metallic fastening devices and the like, and which may be easily and quickly applied to and removed from a patient.

A still further object of the invention is to provide a belt of the character indicated which is simple, compact and lightweight in design; which is strong and durable in construction; which is reasonable in manufacturing cost; and which is capable of performing its intended functions in an entrely satisfactory manner.

The enumerated objects and additional objects, together with the advantages of the invention, will be readily understood by persons trained in the art from the following detailed description and the annexed drawings which describe and illustrate a preferred and recommended embodiment of the invention.

In the drawings, wherein like reference characters denote corresponding parts in the several views:

FIG. 1 is a front elevation view of a pelvic traction belt constructed in accordance with this invention, the belt being shown with its ends detached and spread out flat;

FIG. 2 is a rear elevation view of the belt shown in FIG. 1;

FIG. 3 is a front elevation view of a length of an elastic material which is used to form the body of the belt appearing in FIGS. 1 and 2;

FIG. 4 is a perspective view on a reduced scale illustrating the belt of FIGS. 1 and 2 with its end portions releasably joined together;

FIG. 5 is an enlarged fragmentary view taken along line 5—5 of FIG. 2; and

FIG. 6 is a perspective view of a patient lying on a hospital bed and showing the belt, which appears in earlier views, applied to the patient and cooperatively associated with a mechanism whereby to apply traction to the patient's pelvic region.

Referring initially to FIGS. 1, 2 and 3, the illustrated form of the present traction belt is generally denoted by the letter B and comprises an elongated, flexible body 10. This body is fabricated from a strip or length 11 of an elastic material having parallel upper and lower edges 12 and 13, respectively, and parallel end edges 14 and 15. Strip 11 preferably consists of a woven elasticized fabric which is resiliently stretchable in a length-wise direction, as indicated by the double arrow in FIG. 3.

Strip 11 is folded along two sets of fold lines 16, 17, 18 and 19 (FIG. 3) and is stitched, as indicated at 20 and 21 (FIG. 5), to obtain corresponding rib-forming pleats 22 and 23. As is best shown in FIGS. 1 and 2, pleats 22 and 23 are tapered, their narrowest ends coinciding with the lower edge of the body and their widest ends coinciding with the upper edge of the body. The ends of the body are provided with reinforcing tapes 24 and 25.

The several tapes and pleats may be considered as dividing body 10 into three panels or portions, namely, a first end portion 26, a central portion 27 and a second end portion 28. End portion 26 is the part of the body 10 which is between tape 24 and pleat 22, central portion 27 is the part of the body between pleats 22 and 23, and end portion 28 is the part of the body between pleat 23 and tape 25. It will be observed from an examination of FIGS. 1 and 2 that central portion 27 is trapezoidal in configuration and that end portions 26 and 28 are angulated relative to the central portion.

The belt is provided with flexible, non-metallic fastening means consisting of a pair of spaced first units 30 which are affixed, preferably by stitching, along the outer face of body end portion 26 and a corresponding pair of spaced second units 31 which are similarly affixed along the inner face of body end portion 28. The fastening means and, therefore, its units 30 and 31 are preferably the same as or similar to the fastening means and corresponding units disclosed in Patent No. 2,717,437, granted September 13, 1955 for "Velvet Type Fabric and Method of Producing Same," or Patent No. 3,009,235, granted November 21, 1961 for "Separable Fastening Device," to which reference may be had for details of construction and operation. It is deemed sufficient for the purposes of this application to point out that units 30 and 31 are adapted to be relatively superposed in face-to-face relationship, as illustrated in FIG. 4, and joined together by pressing each outer unit against a corresponding inner unit. This effects firm connection between body end portions 26 and 28. The end portions of the body may be subsequently and readily detached from each other by grasping the free end of body portion 28 and "peeling" units 31 from units 30.

Belt B is equipped with a pair of flexible yoke straps 33 which are preferably made of webbing. One of the yoke straps is anchored at one end by stitching to body end portion 26 and at its other end to body central portion 27. The other yoke strap is similarly anchored at one end to body central portion 27 and at its other end to body end portion 28. The belt is also equipped with a pair of tensioning straps 34 which are also made of webbing. Each tensioning strap is connected to a corresponding yoke strap by means of a slip ring 35, as indicated in FIG. 1.

Referring now to FIG. 6, that view illustrates a hospital bed 36 having a footboard 37. Lying prone on the bed is a patient P to whom belt B has been applied. In applying the belt to the patient, body 10 is wrapped around his waist at the crest of his hip bones. The belt body is stressed in tension to exert requisite uniform compression on the patient's body and fastener units 30 and 31 are joined together in the manner outlined earlier herein.

The belt is then connected to a mechanism 40 which is mounted on footboard 37 and which coacts with the belt to apply desired traction to the patient's pelvic region. Mechanism 40 includes a lower yoke 41 consisting of a tubular body 42, which carries a set screw 43, and a pair of hook members 44, which engage the lower edge portion of the footboard. Mechanism 40 also includes an upper yoke 45 consisting of a tubular body 46, which carries a set screw 47, and a pair of hook members 48, which engage the upper edge portion of the footboard. A tubular post 50 registers with the openings in tubular bodies 42 and 46 and is vertically adjustable with the aid of set screws 43 and 47. An arm 50 extends laterally from the post and is adjustably secured thereto by a clamp 52. Mounted on arm 50 is a connector 53, which carries a pulley 54.

Each tensioning strap 35 extends through an opening (not shown) in a spreader bar 55 and is secured thereto by a corresponding buckle 56. It will be observed that buckles 56 are spaced apart. A flexible connector, such as a length of sash cord 57, is anchored at one end to the spreader bar midway between buckles 56. The sash cord extends over the pulley and is provided at its other end with a hook 58 which is adapted to receive one or more weights W of known mass. It will be appreciated that weight W coacts with sash cord 57, spreader bar 55, tensioning straps 35, yoke straps 33 and belt B to exert requisite traction to the patient's pelvic region.

From the foregoing, it is believed that the objects, advantages, construction and utility of the present invention will be readily comprehended by persons skilled in the art, without further description. Although the invention has been herein shown and described in a simple, practicable form, it is recognized that certain parts thereof are representative of other parts which may be used in substantially the same manner to accomplish substantially the same results. Therefore, it is to be understood that the invention is not to be limited to the exact details described herein but is to be accorded the full scope and protection of the appended claims.

I claim:

1. In a pelvic traction belt, an elongated body made of a single length of a material resiliently stretchable in a lengthwise direction and having lengthwise parallel edges and adapted to be wrapped around the waist of a patient, parts of the material being folded and joined together to obtain a pair of spaced generally transverse rib portions, a body central portion intermediate the rib portions and a pair of body end portions, said body central portion having a generally trapezoidal configuration, each body end portion extending beyond the side of a corresponding rib portion which is remote from the body central portion, the body end portions being angulated in relation to the body central portion, separable non-metallic fastening means consisting of a first unit carried by one body end portion and a second unit carried by the other body end portion, said units being on opposite sides of the respective body end portions and cooperative to be releasably joined together by pressing one thereof against the other, and means secured to the belt material and adapted to be connected to traction applying apparatus.

2. A pelvic traction belt according to claim 1 wherein each rib comprises a pleat which is tapered in the same direction.

3. In a pelvic traction belt, an elongated body made of a single length of a material resiliently stretchable in a lengthwise direction and having lengthwise parallel edges and adapted to be wrapped around the waist of a patient, parts of the material being folded and joined together to obtain a pair of spaced generally transverse rib portions, a body central portion intermediate the rib portions and a pair of body end portions, each body end portion extending beyond the side of a corresponding rib portion which is remote from the body central portion, the body end portions being angulated in relation to the body central portion, separable non-metallic fastening means consisting of a first unit carried by one body end portion and a second unit carried by the other body end portion, said units being on opposite sides of the respective body end portions and cooperative to be releasably joined together by pressing one thereof against the other, a pair of first straps, one end of each first strap being secured to a corresponding body end portion, the other end of each first strap being secured to the body central portion, a pair of second straps, and means forming a sliding connection between each first strap and an end of a corresponding second strap.

4. A pelvic traction belt according to claim 3 wherein the body central portion has a generally trapezoidal configuration, and wherein each rib portion comprises a pleat.

References Cited by the Examiner

UNITED STATES PATENTS

| | | | |
|---|---|---|---|
| 2,966,906 | 1/61 | Wiltrout | 128—75 |
| 3,021,838 | 2/62 | Fine | 128—96 |
| 3,054,400 | 9/62 | Lizio | 128—505 |

FOREIGN PATENTS

| | | |
|---|---|---|
| 716,904 | 10/54 | Great Britain. |
| 706,425 | 6/31 | France. |

OTHER REFERENCES

Dressmaking Made Easy, by the McCall Co., in New York, 1935, pp. 44 and 45.

RICHARD A. GAUDET, *Primary Examiner.*

ROBERT E. MORGAN, *Examiner.*